United States Patent
Jang et al.

(10) Patent No.: US 11,528,645 B2
(45) Date of Patent: Dec. 13, 2022

(54) METHOD AND APPARATUS FOR CONFIGURING CARRIER AGGREGATION FOR SERVING CELLS HAVING DIFFERENT START TIME POINTS IN FRAME IN WIRELESS COMMUNICATION SYSTEM

(71) Applicant: Samsung Electronics Co., Ltd., Suwon-si (KR)

(72) Inventors: Jaehyuk Jang, Suwon-si (KR); Soenghun Kim, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 143 days.

(21) Appl. No.: 17/034,537

(22) Filed: Sep. 28, 2020

(65) Prior Publication Data

US 2021/0105677 A1    Apr. 8, 2021

(30) Foreign Application Priority Data

Oct. 2, 2019   (KR) .................. 10-2019-0122295
Dec. 16, 2019  (KR) .................. 10-2019-0168247
Sep. 15, 2020  (KR) .................. 10-2020-0118408

(51) Int. Cl.
*H04W 36/00* (2009.01)
*H04W 72/14* (2009.01)
(Continued)

(52) U.S. Cl.
CPC ....... *H04W 36/0077* (2013.01); *H04L 5/0098* (2013.01); *H04W 24/10* (2013.01);
(Continued)

(58) Field of Classification Search
CPC ......... H04W 36/0077; H04W 36/0094; H04W 76/28; H04W 24/10; H04W 72/14; H04W 74/0816; H04L 5/0098
See application file for complete search history.

(56) References Cited

U.S. PATENT DOCUMENTS 10,004,107 B2 *   6/2018  Jha ................... H04W 52/0212
2010/0197316 A1 * 8/2010  Aoyama .......... H04W 52/0216
                                                   455/67.13
(Continued)

FOREIGN PATENT DOCUMENTS

KR       10-2003246 B1       7/2019
WO    WO-2021054801 A1 *    3/2021

OTHER PUBLICATIONS

ZTE Corporation, 'Discussion on frame boundary alignment of NR CA', RP-191839, 3GPP TSG RAN Meeting #85, Newport Beach, USA, Sep. 9, 2019, sections 2.2.1-2.3; and figures 1-3.
(Continued)

*Primary Examiner* — Khai M Nguyen
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. According to the disclosure, a base station may configure serving cells having different frame start time points, using carrier aggregation (CA), for operation of a terminal, and thus can increase the transmission rate of the terminal.

16 Claims, 9 Drawing Sheets

(51) Int. Cl.
  *H04L 5/00* (2006.01)
  *H04W 76/28* (2018.01)
  *H04W 74/08* (2009.01)
  *H04W 24/10* (2009.01)

(52) U.S. Cl.
  CPC ....... *H04W 36/0094* (2013.01); *H04W 72/14* (2013.01); *H04W 74/0816* (2013.01); *H04W 76/28* (2018.02)

(56) References Cited

U.S. PATENT DOCUMENTS

| | | |
|---|---|---|
| 2016/0014706 A1 | 1/2016 | Vajapeyam et al. |
| 2016/0192304 A1 | 6/2016 | Yi et al. |
| 2018/0077596 A1 | 3/2018 | Huang et al. |
| 2020/0205139 A1 | 6/2020 | Jang et al. |
| 2022/0217032 A1* | 7/2022 | Ko .................... H04W 72/0446 |

OTHER PUBLICATIONS

3GPP; TSG RAN; E-UTRA; RRC; Protocol specification (Release 15)', 3GPP TS 36.331 V15.7.0 (Sep. 2019), Sep. 27, 2019, sections 5.6.3-5.6.3.3.
3GPP; TSG RAN; NR; UE radio access capabilities (Release 15), 3GPP TS 38.306 V15.7.0 (Sep. 2019), Sep. 27, 2019, sections 4.2-4.2.2.
International Search Report dated Jan. 8, 2021, issued in International Application No. PCT/KR2020/013270.
CMCC: "Summary of discussion on relaxation of the frame,timing for R16 NR CA", 3GPP Draft; RP-192304 Discussion on the Relaxation of the Frame,Timing in R16 NR CA, 3rd Generation Partnership Project (3GPP), Mobile,Competence Centre; 650, Route Des Lucioles; F-06921 Sophia-Anti, vol. TSG RAN, No. New Port Beach, US; Sep. 20, 2019 (Sep. 20, 2019), XP051779523, Retrieved from the Internet: www.3gpp.org/ftp/Meetings_3GPP_SYNC_/RAN/Docs/RP-192304.zip.
European Search Report dated Dec. 8, 2021, issued in European Application No. 20872694.3.

* cited by examiner

METHOD AND APPARATUS FOR CONFIGURING CARRIER AGGREGATION FOR SERVING CELLS HAVING DIFFERENT START TIME POINTS IN FRAME IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0122295, filed on Oct. 2, 2019, in the Korean Intellectual Property Office, and of a Korean patent application number 10-2019-0168247, filed on Dec. 16, 2019, in the Korean Intellectual Property Office, and of a Korean patent application number 10-2020-0118408, filed on Sep. 15, 2020, in the Korean Intellectual Property Office, the disclosure of each of which is incorporated by reference herein in its entirety.

BACKGROUND

1. Field

The disclosure relates to a method for configuring serving cells having different frame start time points, using carrier aggregation (CA), in a new radio (NR) system which is a 5' generation (5G) mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, there is a need for a method for configuring carrier aggregation (CA) for serving cells having different frame start time points.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for configuring serving cells having different frame start time points, using carrier aggregation (CA).

Additional aspects will be set forth in part in the description which follows and, in part, will be apparent from the description, or may be learned by practice of the presented embodiments.

In accordance with an aspect of the disclosure, a method by a terminal in a wireless communication system is provided. The method includes transmitting a first message including capability information indicating whether a terminal supports carrier aggregation operation where frame boundaries of a first cell and a second cell are not aligned, receiving a second message including slot offset information between the first cell and the second cell and determining time offset for the second cell based on the first cell according to the slot offset information, in case that the frame boundaries of the first cell and the second cell are not aligned.

In accordance with another aspect of the disclosure, a method by a base station in a wireless communication system is provided. The method includes receiving a first message including capability information indicating whether a terminal supports carrier aggregation operation where frame boundaries of a first cell and a second cell are not aligned, determining a second message including slot offset information between the first cell and the second cell, and transmitting the second message, wherein time offset for the second cell based on the first cell is determined according to the slot offset information, in case that the frame boundaries of the first cell and the second cell are not aligned.

In accordance with another aspect of the disclosure, a terminal in a wireless communication system is provided. The terminal includes a transceiver and at least one processor configured to control the transceiver to transmit a first message including capability information indicating whether a terminal supports carrier aggregation operation where frame boundaries of a first cell and a second cell are not aligned and receive a second message including slot offset information between the first cell and the second cell, and determine time offset for the second cell based on the first cell according to the slot offset information, in case that the frame boundaries of the first cell and the second cell are not aligned.

In accordance with another aspect of the disclosure, a base station in a wireless communication system is provided. The base station includes a transceiver and at least one processor configured to control the transceiver to receive a first message including capability information indicating whether a terminal supports carrier aggregation operation where frame boundaries of a first cell and a second cell are not aligned, determine a second message including slot offset information between the first cell and the second cell, and control the transceiver to transmit the second message, wherein time offset for the second cell based on the first cell is determined according to the slot offset information, in case that the frame boundaries of the first cell and the second cell are not aligned.

According to an embodiment, a base station may configure serving cells having different frame start time points, using CA, for operation of a terminal, and thus can increase the transmission rate of the terminal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
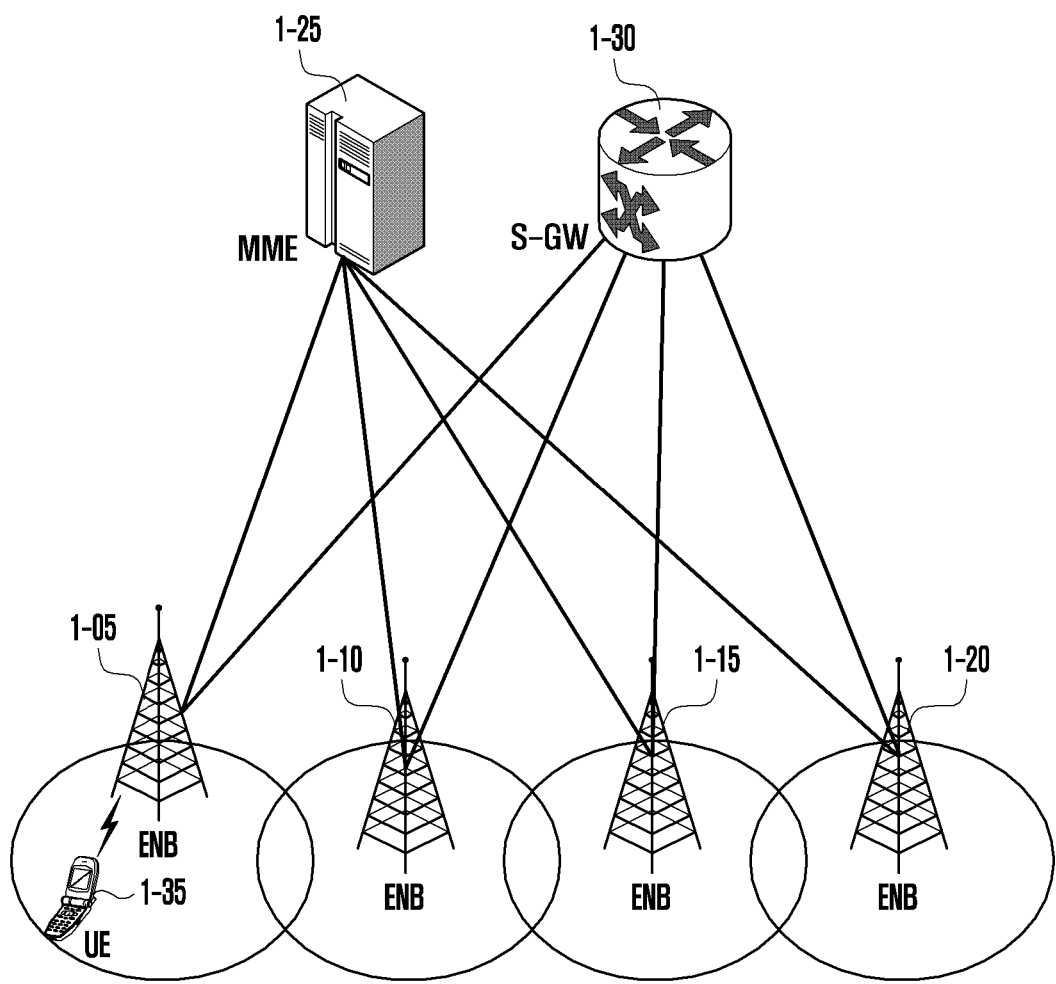
FIG. 1 illustrates a structure of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in the embodiments may include one or more processors.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards, the latest existing communication standards, for the convenience of description. However, the disclosure is not limited by these terms and names, and may be applied in the same way to systems that conform other standards. In particular, the disclosure may be applied to the 3GPP new radio (NR: 5G mobile communication standards) system.

FIG. 1 illustrates a structure of a long term evolution (LTE) system according to an embodiment of the disclosure.

Referring to FIG. 1, a wireless communication system includes a plurality of base stations 1-05, 1-10, 1-15, and 1-20, a mobility management entity (MME) 1-25, and a serving-gateway (S-GW) 1-30. A user equipment (hereinafter, referred to as a UE or a terminal) 1-35 accesses an external network through the base stations 1-05, 1-10, 1-15, and 1-20 and the S-GW 1-30.

The base stations 1-05, 1-10, 1-15, and 1-20 are access nodes of a cellular network and provide a wireless access to terminals which access the network. That is, the base stations 1-05, 1-10, 1-15, and 1-20 collect status information such as buffer status, available transmission power status, and channel status of the terminals to perform scheduling and support connection among the terminals and a core network (CN) in order to service traffic of users. The MME 1-25 is a device responsible for various control functions as well as a mobility management function for a terminal, and is connected to a plurality of base stations, and the S-GW 1-30 is a device which provides a data bearer. In addition, the MME 1-25 and the S-GW 1-30 may further perform authentication, bearer management, and/or the like for a terminal accessing the network, and process a packet arriving from the base stations 1-05, 1-10, 1-15, and 1-20 or a packet to be transmitted to the base stations 1-05, 1-10, 1-15, and 1-20.

Figure 2:
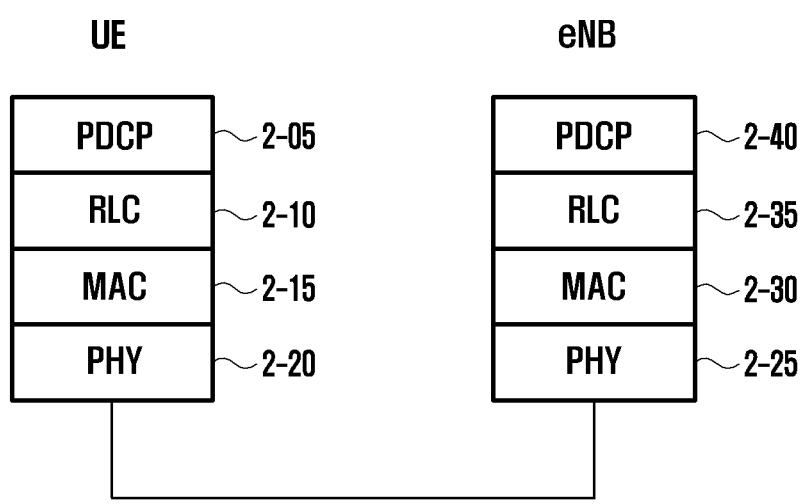
FIG. 2 illustrates a wireless protocol structure of an LTE system according to an embodiment of the disclosure.

FIG. 2 illustrates a wireless protocol structure of an LTE system according to an embodiment of the disclosure. An NR to be defined hereafter may be partially different from the wireless protocol structure in the drawing, but will be described for convenience of description of the disclosure.

Referring to FIG. 2, in a wireless protocol of an LTE system, a terminal and an ENB include packet data convergence protocols (PDCPs) 2-05 and 2-40, radio link controls (RLCs) 2-10 and 2-35, and medium access controls (MACs) 2-15 and 2-30, respectively. The packet data convergence protocols (PDCPs) 2-05 and 2-40 are responsible for an operation such as IP header compression/decompression, and the radio link controls (hereinafter, referred to as RLCs) 2-10 and 2-35 reconfigure a PDCP packet data unit (PDU) in an appropriate size. The MACs 2-15 and 2-30 are connected to several RLC layer devices configured in one terminal and perform an operation of multiplexing RLC PDUs into an MAC PDU and demultiplexing the RLC PDUs from the MAC PDU. The physical layers 2-20 and 2-25 perform an operation of channel-coding and modulating higher layer data into OFDM symbols to transmit the OFDM symbols through a wireless channel, or an operation of demodulating and channel-decoding OFDM symbols received through a wireless channel to transmit the demodulated and channel-decoded OFDM symbols to a higher layer. In addition, even the physical layers use a hybrid automatic repeat request (HARQ) for additional error correction, and a receiving end transmits whether to receive a packet transmitted from a transmitting end by 1 bit. This is called HARQ ACK/NACK information. Downlink HARQ ACK/NACK information for uplink transmission may be transmitted through a physical hybrid-ARQ indicator channel (PHICH) physical channel, and uplink HARQ ACK/NACK information for downlink transmission may be transmitted through a physical uplink control channel (PUCCH) or physical uplink shared channel (PUSCH) physical channel. The PUCCH is used for the terminal to transfer not only the HARQ ACK/NACK information but also downlink channel status information (CSI) and scheduling request (SR) to the base station. When the terminal transmits the SR that is 1-bit information to a resource within the PUCCH configured by the base station, the base station recognizes that the corresponding terminal has data to be transmitted to an uplink, and allocates an uplink resource. Through the uplink resource, the terminal may transmit a detailed buffer status report (BSR) message. The base station may allocate a plurality of SR resources to one terminal.

The physical layer (PHY) may include one or a plurality of frequencies/carriers, and a technology for one base station to simultaneously configure and use a plurality of frequencies is called carrier aggregation (hereinafter referred to as "CA") technology. In the CA technology, instead of only one carrier, one or more secondary carriers in addition to a primary carrier are used for communication between a terminal (or a user equipment (UE)) and a base station (or E-UTRAN NodeB (eNB)), to greatly increase the transmission quantity in proportion to the number of secondary carriers. In the LTE, a cell within a base station using a primary carrier is called a primary cell (PCell), and a secondary carrier is called a secondary cell (SCell). A technology for extending the CA function to two base stations is called dual connectivity (hereinafter referred to as "DC") technology. In the DC technology, the terminal simultaneously connects and uses a master base station (master E-UTRAN NodeB, hereinafter, referred to as "MeNB")) and a secondary base station (secondary E-UTRAN NodeB, hereinafter, referred to as "SeNB")), and cells belonging to the MeNB are called a master cell group (hereinafter, referred to as "MCG"), and cells belonging to the SeNB are called a secondary cell group (hereinafter, referred to as "SCG"). Each cell group has a representative cell, and the representative cell of the master cell group is called a primary cell (hereinafter, referred to as "PCell"), and the representative cell of the secondary cell group is called a primary secondary cell (hereinafter, referred to as "PSCell"). In a case of using the above-described NR, the MCG uses the LTE technology, and the SCG uses the NR, so that the terminal may simultaneously use the LTE and the NR. This is called E-UTRA-NR dual connectivity (EN-DC). Conversely, a scenario in which the MCG uses the NR technology and the SCG uses the LTE technology may also be considered, which is called NR-E-UTRA dual connectivity (NE-DC). In addition, a technology in which both the MCG and SCG use the NR technology is called NR-NR dual connectivity (NR-DC).

Although not shown in the drawing, radio resource control (hereinafter, referred to as "RRC") layers exist above the PDCP layers of the terminal and the base station, respectively, and the RRC layer may transmit or receive access and measurement-related configuration control messages for a radio resource control. For example, a message of the RRC layer may be used to instruct the terminal to perform measurement, and the terminal may report a result of the measurement to the base station by using the message of the RRC layer.

Meanwhile, the transmission units of the PCell and SCell may be the same or different. For example, in the LTE, the transmission units of the PCell and SCell may be the same in a 1 ms unit, but in the NR, the transmission unit (slot) of the PCell is 1 ms, and the transmission unit of the SCell may have a length of 0.5 ms.

Table 1 below shows information on a length of a slot which is available in each serving cell (that is, PCell or SCell) according to numerology (or secondary carrier spacing) used by each serving cell in the NR.

TABLE 1

| | | | | | |
|---|---|---|---|---|---|
| Secondary carrier spacing (kHz) | 15 | 30 | 60 | 120 | 240 |
| Length (ms) of transmission unit (slot) | 1 | 0.5 | 0.25 | 0.125 | 0.00625 |
| Number of slots in subframe (1 ms) | 1 | 2 | 4 | 8 | 12 |

In addition, in the LTE and NR, the following units are used in a frame structure in a radio interval (that is, between the base station and the terminal).

Radio frame: It has a length of 10 ms and is identified by a system frame number (SFN) for each radio frame.

Subframe: It has a length of 1 ms, wherein the radio frame has 10 subframes. The subframes are identified by subframe numbers 0 to 9 within each radio frame.

Slot: It has a length according to a value configured as shown in the table, and is a transmission unit used when the base station and the terminal transmit data.

Figure 3A:
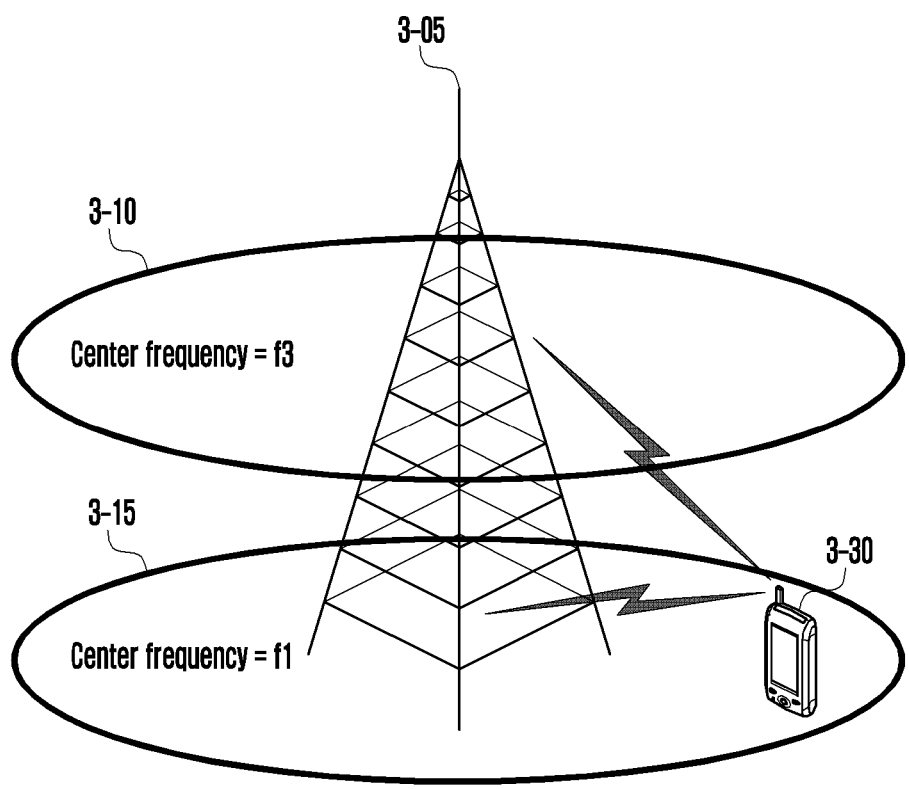
FIG. 3A is a view for explaining a carrier aggregation (CA) technology in a terminal according to an embodiment of the disclosure.
Figure 3B:
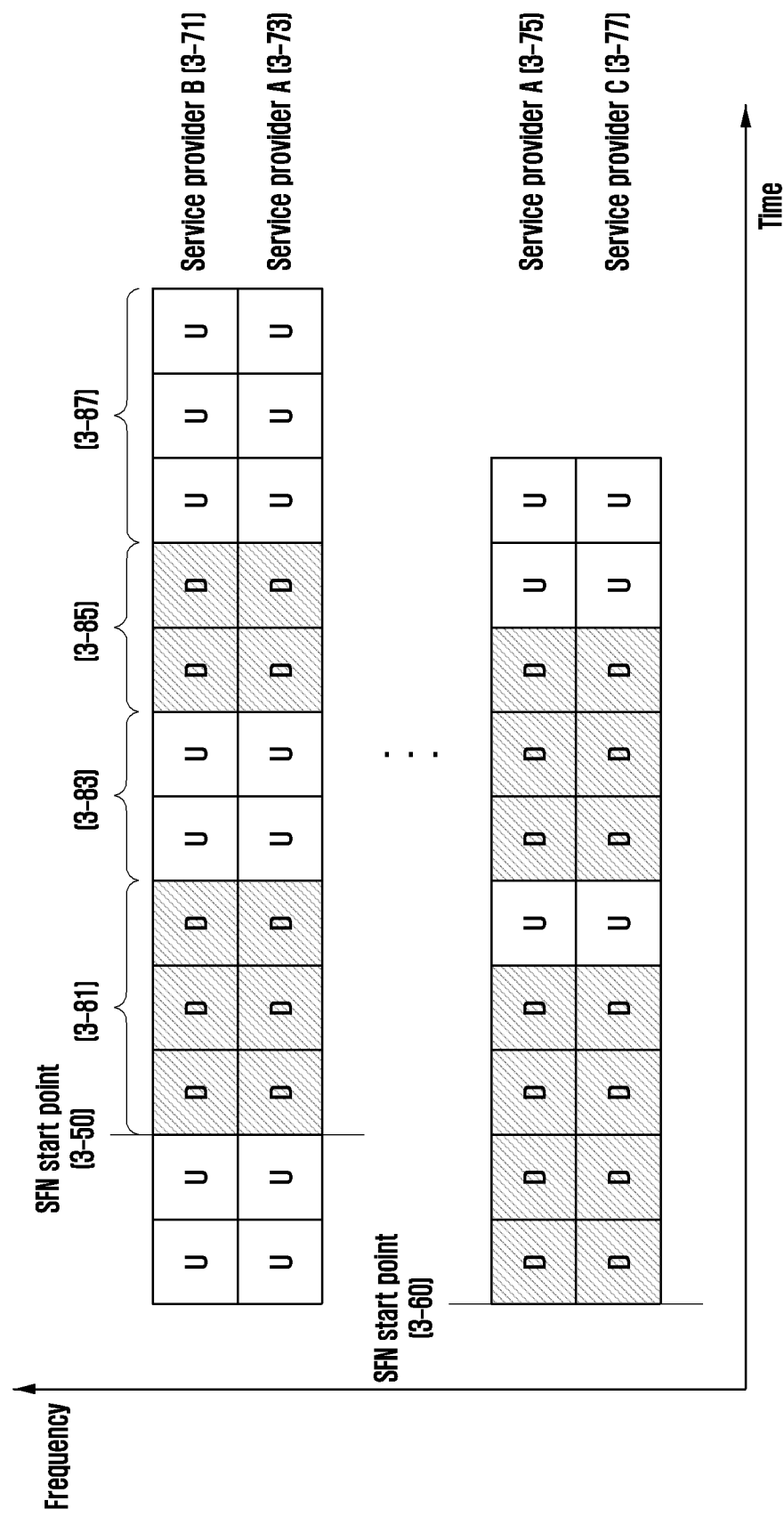
FIG. 3B is a view for explaining a carrier aggregation (CA) technology in a terminal according to an embodiment of the disclosure.

FIGS. 3A and 3B are views for explaining a carrier aggregation (CA) technology in a terminal according to various embodiments of the disclosure.

Referring to FIGS. 3A and 3B, in one base station, multi-carriers may be transmitted or received over several frequency bands in general. For example, when a base station 3-05 transmits a carrier 3-15 of which a center frequency is f1 and a carrier 3-10 of which a center frequency is f3, in the prior art, one terminal transmits or receives data by using one carrier between the two carriers. However, a terminal having a carrier aggregation capability may transmit or receive data by simultaneously using multiple carriers. The base station 3-05 may allocate more carriers to a terminal 3-30 having a carrier aggregation capability according to circumstances, so as to increase the transmission rate of the terminal 3-30.

When one forward carrier and one backward carrier transmitted and received by one base station form one cell, the carrier aggregation may be understood as transmitting or receiving of data through multiple cells simultaneously by the terminal in a traditional meaning Through the carrier aggregation, the maximum transmission rate is increased in proportion to the number of aggregated carriers (or the number of serving cells).

In the following description of the disclosure, receiving of data through a forward carrier or transmitting of data through a backward carrier by the terminal implies the same as transmitting or receiving of data through a control channel and a data channel provided from a cell corresponding to a center frequency and a frequency band characterizing the carriers.

For a CA configuration (or for a handover to a neighboring base station, etc.), the terminal may receive, from the base station, a measurement configuration to report a result obtained by measuring a neighboring cell. Accordingly, the terminal may perform measurement according to the measurement configuration received from the base station and report the performed measurement result to the base station. The measurement configuration may include detailed information on the frequency which is to be measured and the condition on which the measurement is reported, and additionally include information on the measurement gap at which the terminal measures another frequency. Accordingly, when a measurement gap is configured for the terminal, the terminal may be allocated a periodic measurement gap according to the configured information. Accordingly, in order to measure frequencies, the measurement of which with the corresponding measurement gap is configured, the terminal does not perform the following operation with the current base station (or in serving cell(s) using a frequency related to the measurement).

PUCCH transmission (HARQ ACK/NACK, SR, CSI)
SRS transmission
PDCCH monitoring and data reception, wherein, however, when the terminal is required to receive an RAR or identify whether Msg3 transmission is successful, the terminal performs PDCCH monitoring and data reception.
Data transmission, wherein, however, when random access is being performed, Msg3 transmission of the random access is required to be performed.

In addition, the terminal may perform data transmission/reception with the base station in an interval excluding the above measurement gap. In the NR, in the case where an operating frequency is 410 MHz to 7125 MHz (with reference to Rel-15 which is version information of the NR), this is called frequency range 1 (FR1), and in the case where an operating frequency is 24250 MHz to 52600 MHz, this is called frequency range 2 (FR2). Accordingly, if the measurement gap is configured for FR1 measurement, in serving cell(s) using an FR1 frequency, the terminal does not perform the above operation, and in serving cell(s) using an FR2 frequency, the terminal may perform the above operation. For example, if the measurement gap is configured for FR2 measurement, in the serving cell(s) using the FR2 frequency, the terminal does not perform the above operation, and in the serving cell(s) using the FR1 frequency, the terminal may perform the above operation. If the measurement gap is not limited to the FR1 and FR2 but is configured for all frequency ranges of the terminal, the terminal does not perform the above operation during the measurement gap in all serving cell(s).

The measurement gap has a periodic measurement gap as described above, and may have a periodic measurement gap starting with reference to an SFN of a specific cell among base stations. This is because, as described above, since the terminal does not perform the above operations during the measurement gap, the terminal and the base station are required to have the same understanding of the measurement gap. Meanwhile, the MCG and the SCG may use different SFNs. In addition, it is possible to assume a scenario in which FR1 and FR2 use different SFNs even within the MCG or the SCG. In this case, the base station may implicitly or explicitly indicate, to the terminal, the cell, with reference to the SFN of which the measurement gap is to be configured.

For example, in the case of the above-described EN-DC, the base station and the terminal may implicitly determine a reference cell for the measurement gap, without a separate explicit indicator. For example, in the case of the measurement gap for FR1, the terminal may identify a start point and a cycle of the measurement gap with reference to an SFN and a subframe boundary of a PCell. In the case of the measurement gap for FR2, the terminal may identify a start point and a cycle of the measurement gap with reference to an SFN and a subframe boundary of one serving cell among serving cells operating in FR2 of (NR SCG).

On the other hand, in the case of NE-DC or NR-DC, when the base station configures a measurement gap for the terminal, the base station may indicate the cell, with reference to the SFN of which the measurement gap is to be configured, by using an explicit indicator. As the explicit indicator, a field such as refServCellIndicator may be used, and the refServCellIndicator may indicate one value among pCell, pSCell, and mcg-FR2, thus indicate one of serving cells using FR2 to be used as a reference among serving cells of the PCell, PSCell, or MCG. In addition, a scenario in which the refServCellIndicator is further extended may be considered in consideration of a scenario in which the MCG uses FR1 and FR2 and the SCG uses the FR1 and FR2 in the NR-DC and, to this end, the refServCellIndicatorExt may be introduced to indicate scg-FR2. Alternatively, in order to configure a measurement gap with reference to an SFN and a subframe boundary of a specific serving cell within the MCG or SCG, a scenario in which an identifier (ServCellIndex) of the serving cell is additionally indicated as the refServCellIndicator may be considered. In this case, (considering the case where a main scenario is FR2), a field such as refServCellIndicatorFR2, which is another extended version of the refServCellIndicator, may be newly defined, and the corresponding field may be defined to indicate the identifier of the serving cell. Accordingly, the terminal may determine the cell, with reference to the SFN and the subframe boundary of which the measurement gap is to be configured when the measurement gap is configured for the terminal. For example, the terminal may identify the configured measurement gap by using an SFN and a subframe of a serving cell at the FR2 frequency indicated by the newly defined field such as the refServCellIndicatorFR2.

When the CA technology is used in an NR system, for each serving cell, frequency division duplexing (FDD) (transmission of a downlink and an uplink using different frequencies) or time division duplexing (TDD) (temporally divided transmissions in the downlink and the uplink at the same frequency) may be selectively used according to a situation of a base station and a service provider.

Specifically, as shown in FIG. 3B, when a TDD technology is used in adjacent frequencies (for example, reference numerals 3-71 and 3-73; or reference numerals 3-75 and 3-77), a TDD pattern (distribution configuration of a downlink (D) and an uplink (U)) is required to be identically used. When a downlink time point and a uplink time point overlap at adjacent frequencies, since a downlink signal of a base station (for example, a base station which transmits a signal that is relatively stronger than a terminal) interferes with an uplink of the adjacent frequency, communication may be difficult due to an interference effect in the corresponding uplink. To this end, as described in the drawing, TDD patterns of service provider A and service provider B are the same (for example, reference numerals 3-71 and 3-73), and TDD patterns of service provider A and service provider C are the same (for example, reference numerals 3-75 and 3-77). Meanwhile, in this example, a scenario in which two carriers 3-73 and 3-75 are used by the service provider A through CA may be considered. In this case, since a desired TDD pattern has been used without a separate agreement between the service providers B and C, patterns between the two carriers 3-73 and 3-75 possessed by the service provider A may be different.

In the NR system, when a TDD pattern is configured for the terminal, a format of a pattern may be configured from a downlink as follows.

For example, a pattern of the service provider B is a repetitive pattern of pattern 1 having slots of three DLs 3-81 and two ULs 3-83 and pattern 2 having slots of two DLs 3-85 and three ULs 3-87. In addition, a pattern of the service provider C is a repetitive pattern of pattern 1 having slots of four DLs and one UL and pattern 2 having slots of three DLs and two ULs.

Table 2 below shows a message format used when the base station configures, to the terminal, a TDD pattern for each serving cell in the NR system. For example, the message format is an existing TDD pattern message format. According to the existing TDD pattern message format, the TDD pattern is configured in the sequence of a downlink slot (nrofDownlinkSlots) and a downlink symbol (nrofDownlinkSymbols) from start time points 3-50 and 3-60 of frames, and reversely, is configured in the sequence of an uplink slot (nrofUplinkSlots) and an uplink symbol (nrofUplinkSymbols), starting from the last position of the corresponding pattern. Accordingly, the whole sequence is defined as a downlink slot (nrofDownlinkSlots), a downlink symbol (nrofDownlinkSymbols), an uplink symbol (nrofUplinkSymbols), and an uplink slot (nrofUplinkSlots).

TABLE 2

```
TDD-UL-DL-ConfigCommon ::=    SEQUENCE {
        referenceSubcarrierSpacing    SubcarrierSpacing,
        pattern1                      TDD-UL-DL-Pattern,
        pattern2                      TDD-UL-DL-Pattern         OPTIONAL, -- Need R
        ...
}
TDD-UL-DL-Pattern ::=  SEQUENCE {
        dl-UL-TransmissionPeriodicity  ENUMERATED {ms0p5, ms0p625, ms1, ms1p25, ms2, ms2p5, ms5, ms10},
        nrofDownlinkSlots              INTEGER (0..maxNrofSlots),
        nrofDownlinkSymbols            INTEGER (0..maxNrofSymbols–1),
        nrofUplinkSlots                INTEGER (0..maxNrofSlots),
        nrofUplinkSymbols              INTEGER (0..maxNrofSymbols–1),
        ...,
        [[
        dl-UL-TransmissionPeriodicity-v1530 ENUMERATED {ms3, ms4}    OPTIONAL -- Need R
        ]]
}
```

According to the format shown in Table 2 above, when the service provider A intends to configure, as an S Cell for the terminal, a serving cell indicated by reference numeral 3-73, by using a serving cell indicated by reference numeral 3-75 as a PCell, there is a problem in that the TDD pattern for the serving cell indicated by reference numeral 3-73, starting from an uplink slot, cannot be configured by using the current signaling structure.

To solve the problem, a method for changing a TDD configuration method may be considered. For example, the method includes a method for additionally signaling an offset by a slot according to the above-described secondary carrier spacing according to referenceSubcarrierSpacing by adding a patternOffset to a message configured by the base station to the terminal as follows. For example, in the case of reference numeral 3-73 of FIG. 3B, patternOffset may be signaled by two slots to notify the service provider that the pattern itself is required to be moved by two slots. The base station can signal, to the terminal, an offset of the cell indicated by reference numeral 3-73 and configured as the SCell in the terminal. As the unit of the patternOffset, a slot unit is shown in this example, but a symbol unit or a subframe unit may be used.

Table 3 below shows example 1 of a new TDD pattern message format.

TABLE 3

```
TDD-UL-DL-ConfigCommon ::=    SEQUENCE {
        referenceSubcarrierSpacing   SubcarrierSpacing,
        pattern1                     TDD-UL-DL-Pattern,
        pattern2                     TDD-UL-DL-Pattern         OPTIONAL, -- Need R
        ...,
        [[
        patternOffset                INTEGER (0..maxNrofSlots) OPTIONAL -- Need R
        ]]
}
```

In another embodiment, when an offset occurs as described above, a method for informing of the number of uplink slots (nrofStartingUplinkSlots) existing from a start point of a corresponding SCell with reference to a PCell may also be considered for the case where an uplink slot is located first. A message format showing the above is shown in Table 4.

For example, Table 4 shows example 2 of a new TDD pattern message format.

TABLE 4

```
TDD-UL-DL-ConfigCommon ::=    SEQUENCE {
        referenceSubcarrierSpacing   SubcarrierSpacing,
        pattern1                     TDD-UL-DL-Pattern,
        pattern2                     TDD-UL-DL-Pattern         OPTIONAL, -- Need R
        ...,
        [[
        nrofStartingUplinkSlots      INTEGER (0..maxNrofSlots) OPTIONAL -- Need R
        ]]
}
```

Another embodiment provides a method for adding 1-bit information (reverse) to generate a new pattern starting from an uplink slot rather than a downlink slot. Specifically, the method is a method for changing an order to the order of an uplink slot (nrofDownlinkSlots), an uplink symbol (nrofDownlinkSymbols), a downlink symbol (nrofUplinkSymbols), and a downlink slot (nrofUplinkSlots), rather than the above-described order of a downlink slot (nrofDownlinkSlots), a downlink symbol (nrofDownlinkSymbols), an uplink symbol (nrofUplinkSymbols), and an uplink slot (nrofUplinkSlots), in the case where the reverse field is included.

For example, Table 5 shows example 3 of a new TDD pattern message format.

(scheme B) may be considered. For example, in the embodiment described above, slot numbers of a PCell and an SCell at the same time point are all the same. However, when slot numbers differ by two slots as shown in FIG. 3B, slot numbers, which have the same difference as the difference between the SFN start time points, may be assigned to the serving cells. For example, when the slot numbers of the carrier 3-75 are increased such as 0, 1, 2, . . . , a method for using slot numbers differing by two slots at the same time point, such as [maximum slot number per frame−2], [maximum slot number per frame−1], 0, 1, 2, . . . may be considered for the carrier 3-73. For example, for each SCell, slot numbers are assigned for each serving cell by using an SFN/slot number corrected by a slot offset signaled for each SCell in addition to TDD pattern information configured for each SCell. The slot offset in the scheme B may be determined in units of slots according to secondary carrier spacing of an SCell, as in the first embodiment of the scheme A, and may have a value of the number of slots from 0 to N or from −N/2 to N/2 (N is an integer, for example, the maximum number of slots in one frame). Accordingly, the terminal may determine that slot 0 of the SCell starts at a

TABLE 5

```
TDD-UL-DL-Pattern ::=    SEQUENCE {
        dl-UL-TransmissionPeriodicity    ENUMERATED {ms0p5, ms0p625, ms1, ms1p25, ms2, ms2p5, ms5, ms10},
        nrofDownlinkSlots                INTEGER (0..maxNrofSlots),
        nrofDownlinkSymbols              INTEGER (0..maxNrofSymbols-1),
        nrofUplinkSlots                  INTEGER (0..maxNrofSlots),
        nrofUplinkSymbols                INTEGER (0..maxNrofSymbols-1),
        ...,
        [[
        dl-UL-TransmissionPeriodicity-v1530   ENUMERATED {ms3, ms4}     OPTIONAL -- Need R
        ]],
        [[
        reverse                          ENUMERATED {true}              OPTIONAL -- Need R
        ]]
}
```

In the above example, schemes (collectively referred to as scheme A) for configuring a new TDD pattern for each serving cell so as not to affect other existing operations are described. However, as another embodiment, a method for assigning slot numbers differently for each serving cell point spaced apart by an amount equal to a slot length*slot offset corresponding to an SCS of the SCell from slot 0 of a PCell. Alternatively, the terminal may determine that slot 0 of the SCell starts at a point spaced apart by an amount equal to a slot length*slot offset corresponding to secondary carrier spacing of the PCell. In the case of the scheme B, various operations using slot numbers may be affected.

For example, in the case of discontinuous reception (DRX) to be described hereinafter, it is necessary to determine the slot number which is used as a reference time point for an SFN to which a DRX cycle is assigned. As an example, the slot number may be determined with reference to slot number 0 and an SFN of the PCell.

In addition, a "configured uplink grant", which is used in order not to transmit, to periodic allocation, a physical downlink control channel (hereinafter, referred to as "PDCCH") used to transmit downlink and uplink scheduling information, has two types. Specifically, Type 1 is a scheme in which both a start time point and a cycle are configured in an RRC layer, and Type 2 is a scheme in which only a cycle is configured in the RRC layer and then an uplink configured through a PDCCH message is "activated". (Once the uplink is activated, thereafter, the uplink may be transmitted according to a cycle configured by an RRC without a PDCCH.) In this case, since a start time point is configured in Type 1, a problem occurs as to the reference which is used to interpret a slot number. Accordingly, a configured uplink of a PCell is determined with reference to an SFN, a slot number, or a symbol number of the PCell, and a configured uplink of an SCell may be defined to start with reference to the PCell if an additional slot offset is not configured, and to start with reference to an adjusted SFN/slot number if the slot offset is configured for the corresponding SCell.

In addition, in the case of an operation of activating the SCell configured by a message of the RRC layer to actually be used, and then deactivating the SCell, MAC control element (CE), which is a control message of a MAC layer, may indicate activation and deactivation of a specific SCell (SCell activation/deactivation MAC CE), and since the terminal having received the MAC CE cannot be immediately activated and deactivated, when the MAC CE is received in an n slot, the corresponding operation is performed in an n+k slot. If slot numbers are different as shown in the scheme B, a start time point is also required to be adjusted, and summarized in Table 6 below.

TABLE 6

| Slot offset of cell to which A/D MAC CE is received | Slot offset of cell to be activated/deactivated | Activate/deactivate @ slot of activated cell when A/D MAC CE is received at n |
| --- | --- | --- |
| none | none | n + k |
| none | offset_1 | n + k + offset_1 |
| offset_2 | none | n + k − offset_2 |
| offset_3 | offset_4 | n + k + offset_4 − offset_3 |

Regardless of a cell having received the MAC CE and a cell to be activated, a cell may always be unconditionally activated at time point n+k with reference to a time point of the PCell.

Figure 4:
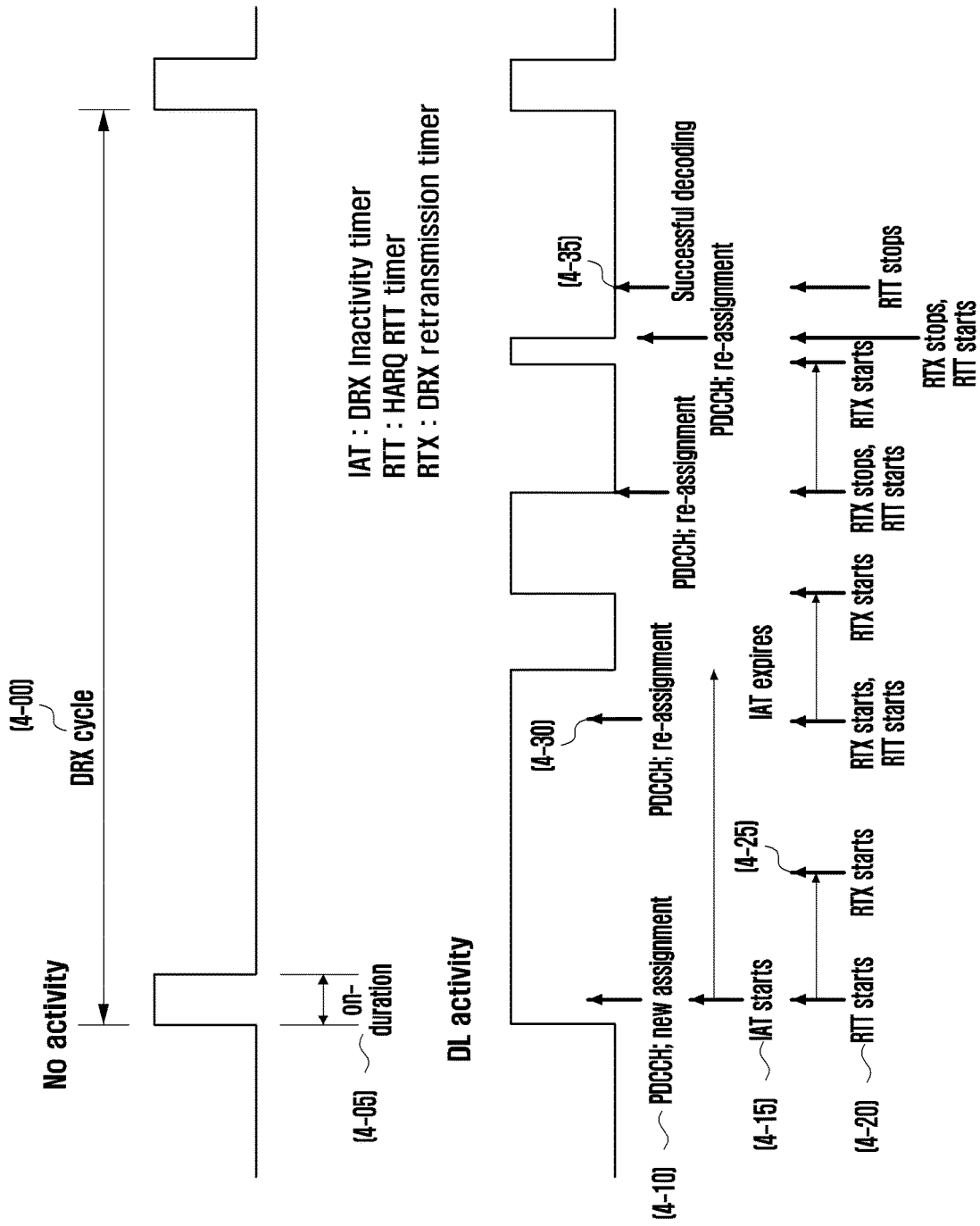
FIG. 4 is a view for explaining a discontinuous reception (DRX) operation of a terminal according to an embodiment of the disclosure.

FIG. 4 is a view for explaining the above-described discontinuous reception (hereinafter, referred to as "DRX") operation of a terminal according to an embodiment of the disclosure.

Referring to FIG. 4, the DRX is a technology for monitoring only some physical downlink control channels (hereinafter, referred to as "PDCCH"s) according to the above configuration information, instead of monitoring all PDCCHs, in order to obtain scheduling information according to the configuration of a base station to minimize power consumption of a terminal. A basic DRX operation has a DRX cycle 4-00 and is to monitor a PDCCH only during on-Duration 4-05 time. In a connected mode, the DRX cycle is configured as two values of a long DRX and a short DRX. In general, the long DRX cycle is applied, and if necessary, the base station may additionally configure the short DRX cycle. If both the long DRX cycle and short DRX cycle are configured, the terminal starts a short DRX timer and repeats from the short DRX cycle. If there is no new traffic until after the short DRX timer expires, the terminal changes a cycle from the short DRX cycle to the long DRX cycle. If, during on-Duration 4-05 time, scheduling information relating to a new packet is received via a PDCCH (operation 4-10), the terminal starts a DRX inactivity timer (operation 4-15). The terminal maintains an active state during the DRX inactivity timer. For example, the terminal continues to perform PDCCH monitoring. In addition, the terminal also starts an HARQ round trip time (RTT) timer (operation 4-20). The HARQ RTT timer may be applied to prevent the terminal from unnecessarily monitoring the PDCCH during an HARQ round trip time (RTT). Therefore, during the timer operation time, the terminal is not required to perform the PDCCH monitoring. However, while the DRX inactivity timer and the HARQ RTT timer operate at the same time, the terminal continues to perform the PDCCH monitoring, based on the DRX inactivity timer. When the HARQ RTT timer expires, a DRX retransmission timer is started (operation 4-25). While the DRX retransmission timer operates, the terminal is required to perform the PDCCH monitoring. In general, during the DRX retransmission timer operation time, scheduling information for HARQ retransmission is received (operation 4-30). When the scheduling information is received, the terminal immediately stops the DRX retransmission timer and starts the HARQ RTT timer again. The above operation continues until the packet is successfully received (operation 4-35).

As described above, in the case where at least two cells in CA have different frame start points, (for example, the case where start points of frames are different, the case where the start points of the frames are not aligned, and the case where boundaries of the frames are not aligned), in the DRX, it is necessary to determine the cell, with reference to a slot number of which is to be used as a reference time point for an SFN to which a DRX cycle is assigned. According to an embodiment, the cell may be determined with reference to slot number 0 and an SFN of a PCell.

Therefore, the terminal may determine DRX duration which is an interval in which an active state is maintained during the DRX inactivity timer, by using the SFN of the PCell.

Figure 5:
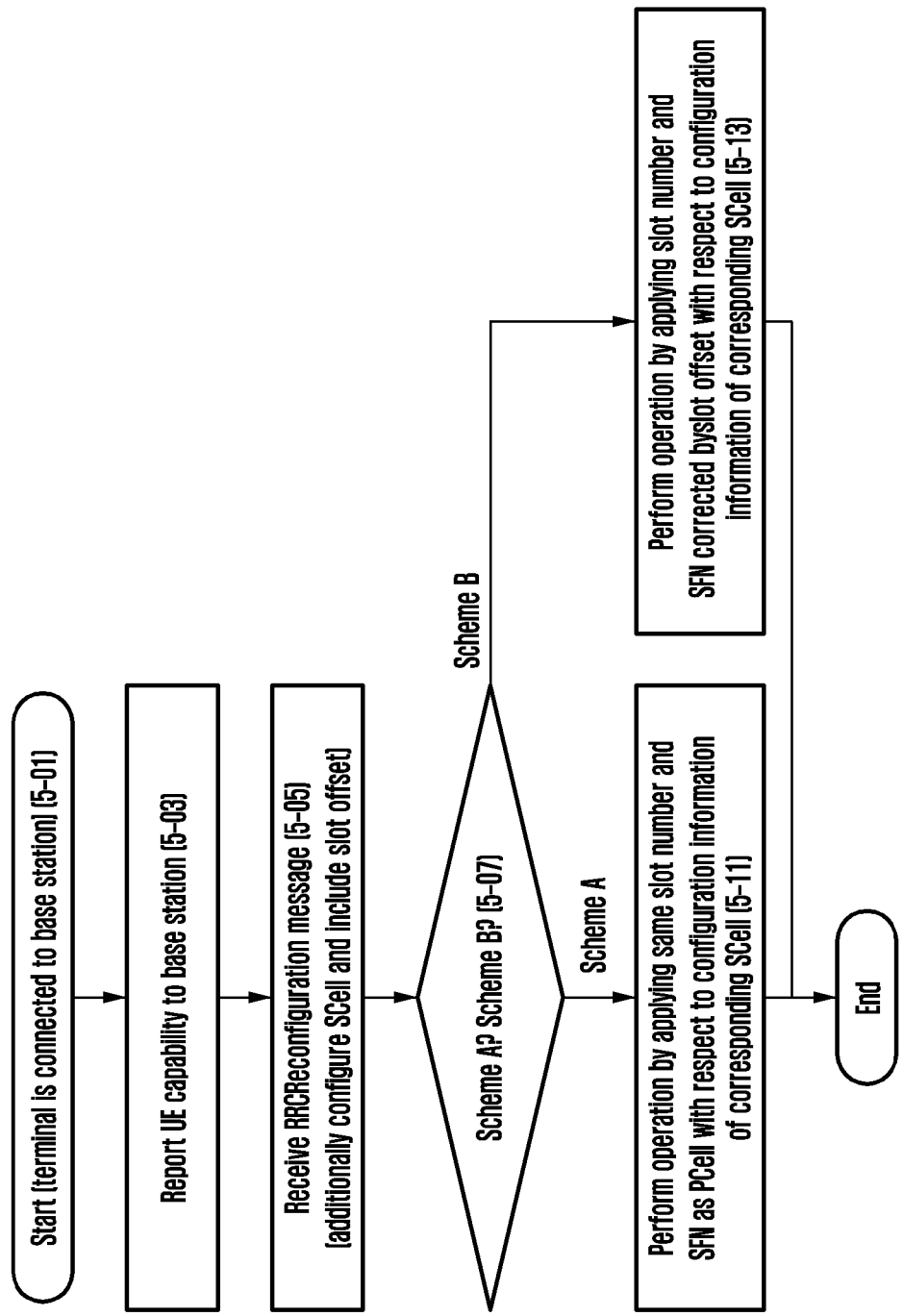
FIG. 5 illustrates an operation sequence of a terminal when operating by configuring serving cells having different frame timings, using CA according to an embodiment of the disclosure.

FIG. 5 is a flowchart showing an operation sequence of a terminal when operating by configuring serving cells having different frame timings, using CA according to an embodiment of the disclosure.

Referring to FIG. 5, in the flowchart, it is assumed that a terminal is in a connection mode (RRC_CONNECTED) state in which data transmission/reception can be performed by establishing a connection to a base station (operation 5-01).

Thereafter, the terminal may report, to the base station, about a capability that the terminal has (operation 5-03). The terminal may report that the terminal may have different frame start points as described in FIG. 3B, through the capability information of the terminal. For example, when at least two cells are configured by using CA, the terminal may report to the base station that the terminal can support having different frame start points for the at least two cells.

The capability may be a capability available in all frequency bands supported by the terminal, or may be a capability available only in a specific frequency band. In the former case, the corresponding capability can be transmitted in 1 bit in the capability information of the terminal, but in the latter case, it is possible to report whether each band or each combination of bands may have a different frame start point.

Thereafter, the terminal may receive an RRCReconfiguration message of an RRC layer from the base station (operation 5-05). The RRCReconfiguration message may be used when various configuration information is configured for the terminal. For example, in the case of adding to additionally use an SCell as described above, configuration information related thereto may be included. The configuration information such as a slot offset required for the above-described scheme A and scheme B may be included in the message of the RRC layer. Various message formats when the scheme A is described are information included in the RRCReconfiguration message.

When the scheme A is used according to the information (operation 5-07), the terminal may perform a corresponding operation by applying the same slot number and SFN as a PCell when the above-described DRX, configured uplink allocation information, and S Cell activation and deactivation time points are calculated (operation 5-11).

However, when the scheme B is used (operation 5-07), the terminal may perform the operation by applying a slot number and SFN corrected by a slot offset as described in FIG. 3B with respect to configuration information of the corresponding SCell (operation 5-13).

In addition, a scenario in which the above-described measurement gap is configured through the RRCReconfiguration message may be considered. In more detail, the following parameters related to the measurement gap may be configured by the base station.

Gap types (for example, gapUE, gapFR1, and gapFR2)
Information on a start point and cycle of a measurement gap within the gap types
Reference indicator of the measurement gap (refServCellIndicator or refServCellIndicatorExt)

When the above-described scheme B is used, in the case of determining an SFN and a subframe boundary by using one serving cell among several serving cells using FR2 such as mcg-FR2 and scg-FR2, an SFN start point may be changed for each serving cell. To this end, the terminal may select one serving cell among cells of which an SFN is not corrected by a slot offset among the corresponding serving cells (for example, among the serving cells using the FR2), so as to determine a location of a measurement gap. Alternatively, as described above, when a measurement gap is configured by the base station, a specific serving cell identifier (ServCellIndex) is indicated, so that the terminal may determine the measurement gap with reference to an SFN and a subframe boundary of the corresponding serving cell. Accordingly, even when an SFN is changed for each serving cell, the terminal may determine a measurement gap with reference to a specific serving cell (for example, a serving cell to which a slot offset is not applied in a PCell, PSCell, or mcg-FR2/scg-FR2, or a specific serving cell indicated by the base station), and measure neighboring cells during the measurement gap at the same timing as the base station.

In more detail, in the case where the gap type configured by the base station is gapFR2, and one of refServCellIndicator and refServCellIndicatorExt is configured, if the corresponding configuration content relates to the PCell or PSCell, the terminal uses the corresponding cell as a reference cell of the measurement gap. However, in the case of mcg-FR2 or scg-FR2, when the scheme B is used, the terminal uses one of serving cells to which an offset is not applied among the serving cells using the FR2, as the reference cell of the measurement gap. Alternatively, as another method, the terminal may use a serving cell having the lowest ServCellIndex among the corresponding serving cells. Alternatively, as described above, the terminal receives a specific ServCellIndex (having a unique value throughout the entire of an MCG and an SCG) indicated by the base station, and uses the indicated serving cell as the reference cell of the measurement gap.

In the case where the gap type configured by the base station is gapFR2, if none of refServCellIndicator and refServCellIndicatorExt is configured, the terminal uses a serving cell in which a predetermined condition is satisfied (for example, in which a slot offset is not configured or which has the lowest ServCellIndex), among the FR2 serving cells, as the reference cell of the measurement gap.

In the case where the gap type configured by the base station is gapFR1 or gapUE, the terminal uses the indicated serving cell among the PCell and PSCell if refServCellIndicator is configured, and always uses the PCell as the reference cell of the measurement gap if refServCellIndicator is not configured.

Alternately, in the case where the gap type configured by the base station is gapFR1 or gapUE, the base station may configure a specific SCell (using FR1) for the terminal as the reference cell of the measurement gap by configuring a separate parameter such as refServCellIndicatorExtFR1 to indicate one SCell among SCells using FR1 used by the base station. This is because even when CA is configured using only the FR1 used by the base station, the subcarrier spacing (SCS) used within the CA may be different (for example, 15 kHz for the PCell and 30 kHz for the SCell). For example, in the above example, since a time slot gap of the SCell is shorter than that of the PCell (one slot is 1 ms for the PCell, and one slot is 0.5 ms for the SCell), the base station may determine the reference cell of the measurement gap with reference to the SCell indicated by refServCellIndicatorExtFR1, so as to configure the measurement gap for the terminal in more detail even for the FR1.

In addition, thereafter (or through the above-described RRCReconfiguration message), the terminal may receive DRX configuration from the base station. The DRX configuration includes timers required for DRX driving, and the respective timers and the time units of the respective timers are as follows.

onDuration timer: set to the number of slots in a reference cell
short DRX cycle: set to the number of slots in a reference cell (or set to the number of subframes)
short DRX cycle timer: set to the number of slots in a reference cell
long DRX cycle: set to the number of slots in a reference cell (or set to the number of subframes)
DRX inactivity timer: set to the number of slots in a reference cell
HARQ RTT timer: set to the number of slots in a corresponding cell in which transmission/retransmission is performed
DRX retransmission timer: set to the number of slots in a corresponding cell in which transmission/retransmission is performed The slot of the reference cell may be a slot of the PCell, or a slot of a cell having the longest transmission unit among all serving cells (that is, PCell and SCell).

Accordingly, the terminal may repeat the corresponding cycle according to the configured cycle, and monitor a PDCCH during onDuration. When there is new data transmission in onDuration, the terminal may drive the DRX inactivity timer at the time point when onDuration ends, and drive the HARQ RTT timer at the time of receiving the new data transmission. When the terminal receives the new data transmission in the above-described active time interval, the terminal may perform the above operation. In addition, when a packet is not successfully received until the HARQ RTT timer expires, the terminal may drive the DRX retransmission timer to monitor the PDCCH for retransmission from the base station. When the packet is successfully received before the HARQ RTT timer expires, the terminal no longer drives the DRX retransmission timer. When both the long DRX cycle and the short DRX cycle are configured as described above, the terminal starts the short DRX timer and repeats from the short DRX cycle, and when there is no new traffic until after the short DRX timer expires, the terminal changes the short DRX cycle to the long DRX cycle. Thereafter, when new traffic occurs, the terminal may use the short DRX cycle again and repeat the above procedure (operation 5-05).

Figure 6:
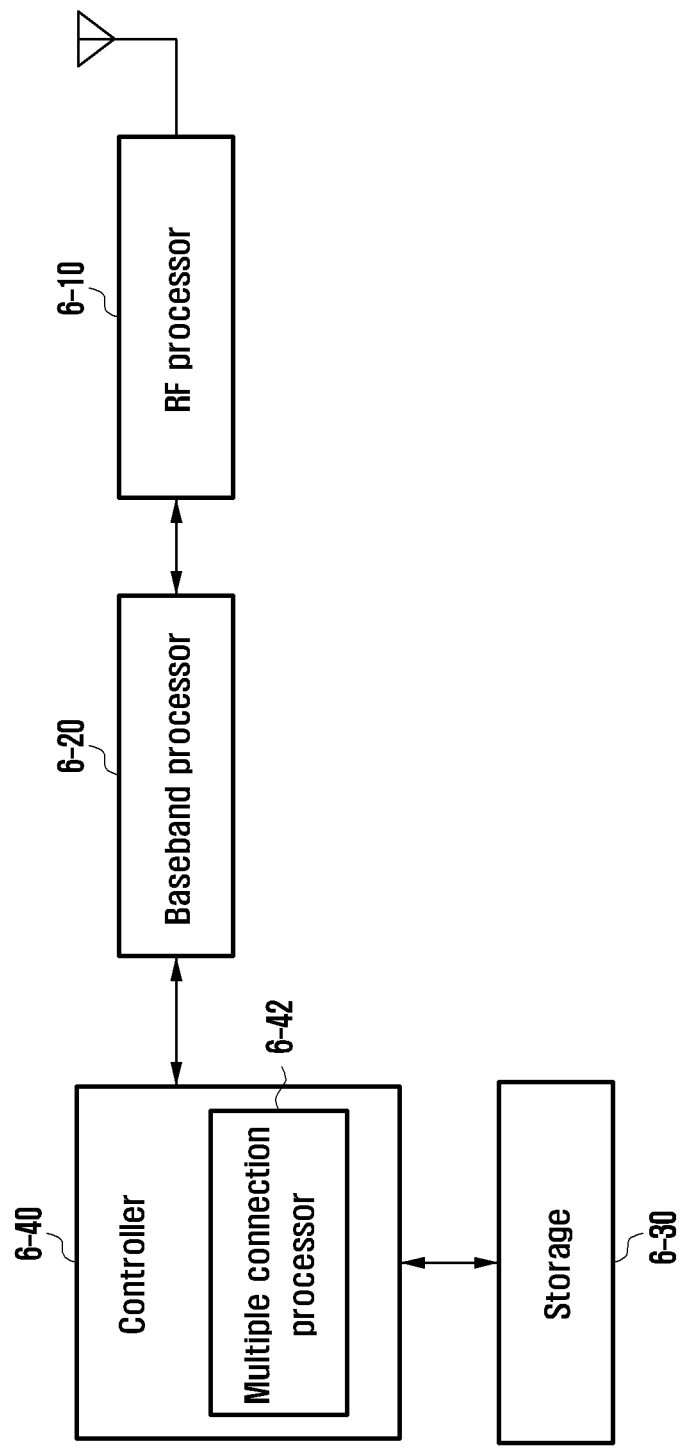
FIG. 6 illustrates a block configuration of a terminal according to an embodiment of the disclosure.

FIG. 6 illustrates a block configuration of a terminal according to an embodiment of the disclosure.

Referring to FIG. 6, the terminal may include a radio frequency (RF) processor 6-10, a baseband processor 6-20, a storage 6-30, and a controller 6-40.

The RF processor 6-10 may perform functions of transmitting or receiving a signal via a wireless channel, such as band conversion and amplification of the signal. For example, the RF processor 6-10 up-converts a baseband signal provided from the baseband processor 6-20 into an RF band signal and then transmits the RF band signal via an antenna, and down-converts the RF band signal received via the antenna into the baseband signal. The RF processor 6-10 may include a transmission filter, a reception filter, an amplifier, a mixer, an oscillator, a digital to analog convertor (DAC), an analog to digital convertor (ADC), and the like. In FIG. 6, only one antenna is shown, but the terminal may include a plurality of antennas. In addition, the RF processor 6-10 may include a plurality of RF chains. Furthermore, the RF processor 6-10 may perform beamforming. For the beamforming, the RF processor 6-10 may adjust a phase and a size of each of signals transmitted or received via the plurality of antennas or antenna elements.

The baseband processor 6-20 may perform a conversion function between a baseband signal and a bit stream according to a physical layer specification of a system. For example, at the time of data transmission, the baseband processor 6-20 may generate complex symbols by encoding and modulating transmission bit streams. In addition, at the time of data reception, the baseband processor 6-20 may demodulate and decode a baseband signal provided from the RF processor 6-10 to restore a reception bit stream. For example, when data is transmitted according to an orthogonal frequency division multiplexing (OFDM) scheme, the baseband processor 6-20 may generate complex symbols by encoding and modulating transmission bit streams and map the complex symbols to subcarriers, and then configure OFDM symbols through an inverse fast Fourier transform (IFFT) operation and a cyclic prefix (CP) insertion. In addition, at the time of data reception, the baseband processor 6-20 may divide a baseband signal provided from the RF processor 6-10 into the units of OFDM symbols and recover the signals mapped to the subcarriers through a fast Fourier transform (FFT) operation, and then restore a reception bit stream through demodulation and decoding.

The baseband processor 6-20 and the RF processor 6-10 may transmit and receive a signal as described above. Accordingly, the baseband processor 6-20 and the RF processor 6-10 may be referred to as a transmitter, a receiver, a transceiver, or a communicator. In addition, at least one of the baseband processor 6-20 and the RF processor 6-10 may include different communication modules in order to process signals of different frequency bands. The different frequency bands may include a super high frequency (SHF) (e.g., 2.5 GHz and 5 GHz) band, and a millimeter wave (e.g., 60 GHz) band.

The storage 6-30 may store data such as a basic program, an application program, and configuration information for the operation of the terminal.

The controller 6-40 may control overall operations of the terminal. For example, the controller 6-40 transmits or receives a signal through the baseband processor 6-20 and the RF processor 6-10. In addition, the controller 6-40 records and reads data on and from the storage 6-30. To this end, the controller 6-40 may include at least one processor. For example, the controller 6-40 may include a communication processor (CP) which performs a control for communication, and an application processor (AP) which controls a higher layer such as an application program. According to an embodiment, the controller 6-40 includes a multiple connection processor 6-42 which performs a process for operating in a multiple connection mode. For example, the controller 6-40 may control the terminal to perform the procedure shown in the operation of the terminal illustrated in FIG. 6.

For example, the controller 6-40 may control the transceiver to transmit a first message including capability information indicating whether a terminal supports a carrier aggregation operation where frame boundaries of a first cell and a second cell are not aligned, and receive a second message including slot offset information between the first cell and the second cell.

In addition, the controller 6-40 may control to determine a time offset for the second cell based on the first cell according to the slot offset information, in a case where the frame boundaries of the first cell and the second cell are not aligned.

According to an embodiment, when a slot offset is configured for the terminal by the base station, the terminal may determine downlink and uplink slots to perform reception and transmission.

Figure 7:
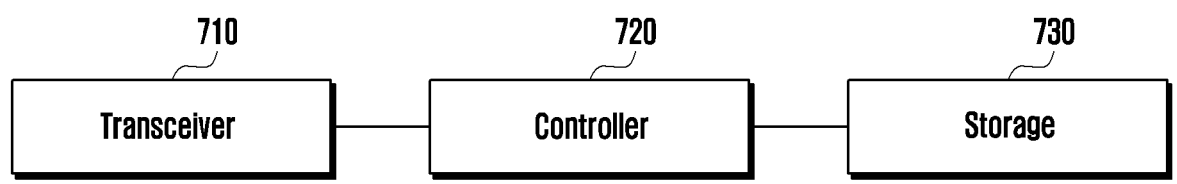
FIG. 7 illustrates a block configuration of a base station according to an embodiment of the disclosure.

FIG. 7 illustrates a structure of a base station according to an embodiment of the disclosure.

Referring to FIG. 7, the base station may include a transceiver 710, a controller 720, and a storage 730. In the disclosure, the controller may be defined as a circuit, an application-specific integrated circuit, or at least one processor.

The transceiver 710 may transmit or receive a signal to or from other network entities. For example, the transceiver 710 may transmit a message to a terminal.

The controller 720 may control the overall operation of the base station according to the embodiment proposed in the disclosure. For example, the controller 720 may control a signal flow between blocks so as to perform the above-described operation.

For example, the controller 720 may control the transceiver to receive a first message including capability information indicating whether a terminal supports a carrier aggregation operation where frame boundaries of a first cell and a second cell are not aligned, and transmit a second message including slot offset information between the first cell and the second cell.

In addition, the controller 720 may control the transceiver to transmit an indicator of a serving cell for configuring a measurement gap with an asynchronous carrier aggregation (CA) involving at least one frequency range 2 (FR2) carrier.

The storage 730 may store at least one of information transmitted or received through the transceiver 710 and information generated through the controller 720. For example, the storage 730 may store capability information of the terminal received from the terminal, SCell configuration information transmitted to the terminal, slot offset information, or the like.

Figure 8:
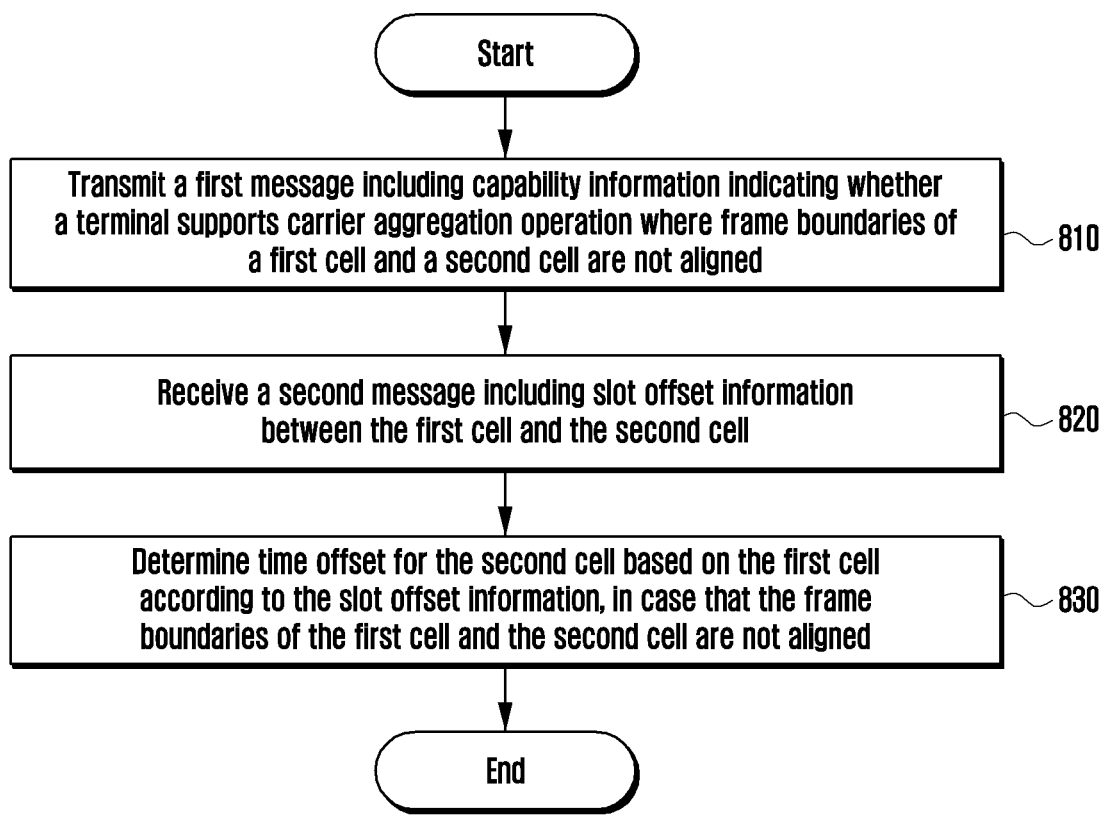
FIG. 8 is a flowchart illustrating a method of a terminal according to an embodiment of the disclosure.

FIG. 8 is a flowchart illustrating a method of a terminal according to an embodiment of the disclosure.

Referring to FIG. 8, firstly, at operation 810, a terminal may transmit a first message including capability information indicating whether the terminal supports a carrier aggregation operation where frame boundaries of a first cell and a second cell are not aligned.

At operation 820, the terminal may receive a second message including slot offset information between the first cell and the second cell.

At operation 830, the terminal may determine a time offset for the second cell based on the first cell according to the slot offset information, in a case where the frame boundaries of the first cell and the second cell are not aligned.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   transmitting a first message including capability information indicating whether a terminal supports carrier aggregation operation where frame boundaries of a first cell and a second cell are not aligned;
   receiving a second message including slot offset information between the first cell and the second cell; and
   determining a time offset for the second cell based on the first cell according to the slot offset information, in case that the frame boundaries of the first cell and the second cell are not aligned,
   wherein a system frame number (SFN) of the first cell is used to calculate a discontinuous reception (DRX) duration.

2. The method of claim 1, further comprising:
   receiving indicator of a serving cell for configuring a measurement gap with an asynchronous carrier aggregation (CA) involving at least one frequency range 2 (FR2) carrier; and
   configuring the measurement gap based on a system frame number (SFN) and a subframe of the serving cell indicated by the received indicator.

3. The method of claim 1, wherein a system frame number (SFN) of a serving cell is used for a configured uplink grant.

4. The method of claim 1, wherein the first cell is primary cell (pcell) and the second cell is at least one secondary cell (scell).

5. A method performed by a base station in a wireless communication system, the method comprising:
   receiving a first message including capability information indicating whether a terminal supports carrier aggregation operation where frame boundaries of a first cell and a second cell are not aligned;
   determining a second message including slot offset information between the first cell and the second cell; and
   transmitting the second message,
   wherein a time offset for the second cell based on the first cell is determined according to the slot offset information, in case that the frame boundaries of the first cell and the second cell are not aligned, and
   wherein a system frame number (SFN) of the first cell is used to calculated a discontinuous reception (DRX) duration.

6. The method of claim 5, further comprising:
   transmitting an indicator of a serving cell for configuring a measurement gap with an asynchronous carrier aggregation (CA) involving at least one frequency range 2 (FR2) carrier,
   wherein the measurement gap is configured based on a system frame number (SFN) and a subframe of the serving cell indicated by the indicator.

7. The method of claim 5, wherein a system frame number (SFN) of a serving cell is used for a configured uplink grant.

8. The method of claim 5, wherein the first cell is primary cell (pcell) and the second cell is at least one secondary cell (scell).

9. A terminal in a wireless communication system, the terminal comprising:
a transceiver; and
at least one processor configured to:
control the transceiver to transmit a first message including capability information indicating whether a terminal supports carrier aggregation operation where frame boundaries of a first cell and a second cell are not aligned and receive a second message including slot offset information between the first cell and the second cell, and
determine a time offset for the second cell based on the first cell according to the slot offset information, in case that the frame boundaries of the first cell and the second cell are not aligned,
wherein a system frame number (SFN) of the first cell is used to calculated a discontinuous reception (DRX) duration.

10. The terminal of claim 9, wherein the at least one processor is further configured to:
control the transceiver to receive indicator of a serving cell for configuring a measurement gap with an asynchronous carrier aggregation (CA) involving at least one frequency range 2 (FR2) carrier, and
configure the measurement gap based on a system frame number (SFN) and a subframe of the serving cell indicated by the received indicator.

11. The terminal of claim 9, wherein a system frame number (SFN) of a serving cell is used for a configured uplink grant.

12. The terminal of claim 9, wherein the first cell is primary cell (pcell) and the second cell is at least one secondary cell (scell).

13. A base station in a wireless communication system, the base station comprising:
a transceiver; and
at least one processor configured to:
control the transceiver to receive a first message including capability information indicating whether a terminal supports carrier aggregation operation where frame boundaries of a first cell and a second cell are not aligned,
determine a second message including slot offset information between the first cell and the second cell, and
control the transceiver to transmit the second message,
wherein a time offset for the second cell based on the first cell is determined according to the slot offset information, in case that the frame boundaries of the first cell and the second cell are not aligned, and
wherein a system frame number (SFN) of the first cell is used to calculated a discontinuous reception (DRX) duration.

14. The base station of claim 13,
wherein the at least one processor is further configured to:
control the transceiver to transmit an indicator of a serving cell for configuring a measurement gap with an asynchronous carrier aggregation (CA) involving at least one frequency range 2 (FR2) carrier, and
wherein the measurement gap is configured based on a system frame number (SFN) and a subframe of the serving cell indicated by the indicator.

15. The base station of claim 13,
wherein a system frame number (SFN) of a serving cell is used for a configured uplink grant.

16. The base station of claim 13, wherein the first cell is primary cell (pcell) and the second cell is at least one secondary cell (scell).

* * * * *